Nov. 19, 1963        H. A. PLASSMAN        3,111,196
UNIVERSAL VEHICLE LIFT
Filed Oct. 24, 1960        2 Sheets-Sheet 1

INVENTOR.
HERBERT A. PLASSMAN
BY
*Hugh A Kirk*
ATT'Y.

Nov. 19, 1963     H. A. PLASSMAN     3,111,196
UNIVERSAL VEHICLE LIFT
Filed Oct. 24, 1960     2 Sheets-Sheet 2
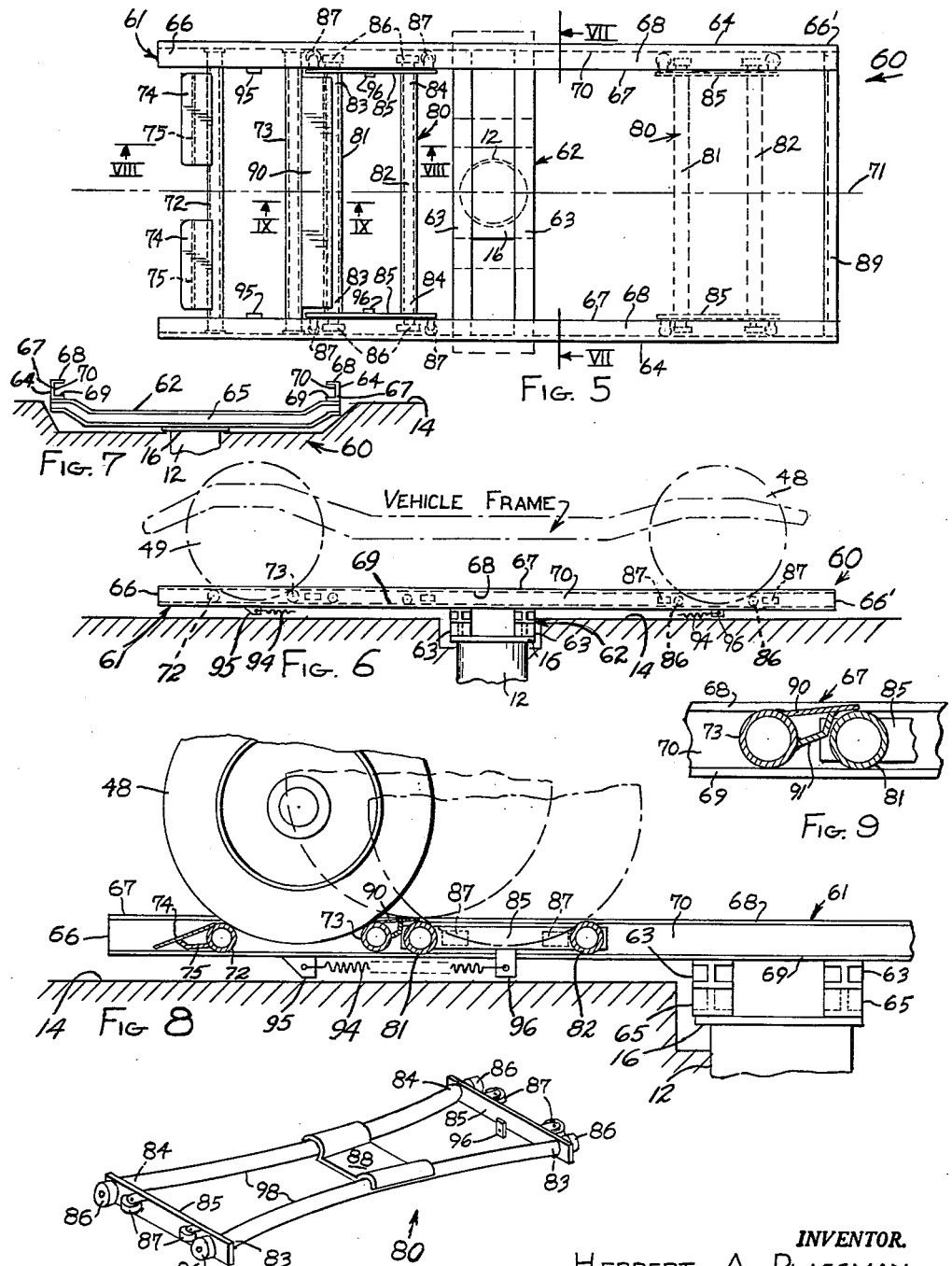
INVENTOR.
HERBERT A. PLASSMAN
BY
ATT'Y.

United States Patent Office 3,111,196
Patented Nov. 19, 1963

3,111,196
UNIVERSAL VEHICLE LIFT
Herbert A. Plassman, Burr Road, R.F.D. 4, Wauseon, Ohio, assignor of twenty percent to Hugh A. Kirk, Toledo, Ohio
Filed Oct. 24, 1960, Ser. No. 64,326
15 Claims. (Cl. 187—8.41)

This invention relates to vehicle lifts. More particularly, it relates to vehicle lifts automatically adaptable to automotive vehicles of any common wheelbase length and track width.

In recent years there has been an increasing appearance of small cars, or "compacts" as they are commonly known, in the American economy, of both foreign and domestic origin. There has also been, in at least one instance, an appearance of automobiles having wider track width, or transverse wheel spacing, than the normal family-sized car produced for so many years in this country. The appearance of these different automobiles having different length wheelbases, often with attendant varying width in track dimension, presents a problem when it is desired to service these cars. Formerly, with the majority of automobiles produced in this country having identical track width and varying only in wheelbase length, it was possible for garages, service stations, and other automotive service businesses to use a vehicle lift of rather standardized nature. These vehicle lifts consisted of essentially two main types: that type using a pair of parallel wheel supporting tracks which lifted the automobile directly into the air, and that form of lift wherein a frame was mounted on the top of a hydraulic lift piston with the frame itself carrying fixtures for engagement with axles, spring posts, or some fixed part of the automobile frame. However, now, when it is desired to install an automobile service location such as in a gas station or a garage, the selection of any such given lift mechanism limits the use to the type of cars which may be serviced on such a lift. Because of the varying dimensions of today's automobiles, a service station proprietor is often forced to install two separate lifts, one for the normally dimensioned car and one for the "compact" car. This is overly expensive in first cost and space, and inefficient during use since there is no guarantee that either the special lift will be available when needed or that one lift will not be used far more than the other.

Accordingly, it is an object of this invention to provide one efficient, simple, effective, economic, and safe vehicle lift which will accommodate automobiles of any common longitudinal spacing between the wheels and of any common transverse wheel spacing.

An object of this invention is to provide such a vehicle lift which automatically provides for length differentials in the wheelbases of various vehicles which may be supported thereon wherein the wheel-carrying supporting structure is adjustable and positionable by the automobile itself, thus requiring no manual adjustment of the lift itself to accommodate different automobiles.

Another object of this invention is to provide such a vehicle lift which requires a minimum of garage floor-space when the lift is retracted.

A further object of this invention is to provide in such a lift a lift or vehicle supporting frame which may readily be adapted for use on existing hydraulic lift columns.

Still another object of this invention is to provide such an automatic universal vehicle lift wherein the vehicle is supported by its wheels, rather than by the vehicle frame, thereby permitting easy access to the parts thereunder for servicing.

Generally speaking, the universal lift of this invention is for automotive vehicles having at least one rear wheel and at least one front wheel. The lift itself includes at least one reciprocable lift column, which may be hydraulically operated, with a frame mounted to the upper free end of this column. The lift frame itself includes in its structure a pair of parallel horizontal surfaces spaced apart from one another running substantially the length of the frame. A rear wheel supporting and locating structure is fixed relative to the frame and may be comprised substantially of a pair of parallel, or substantially parallel spaced bars between which the rear vehicle wheels may be supported. The lift frame also carries a front wheel supporting carriage structure movable by the front wheels of the vehicle when they roll on said front wheel carriage structure as the vehicle enters the lift. This front wheel supporting carriage structure may be comprised of a pair of wheel engaging bars rigidly connected to a bar supporting plate which may have both supporting and guiding rollers affixed thereto for frictionless engagement along and preferably also sole support by the parallel horizontal surfaces of the lift frame.

The lift frame may appear in two forms, either as a single structural beam-like member having the wheel supporting bars projecting from either side thereof with the frame beam lying along the longitudinal center line of the vehicle supported, or the lift frame may assume the form of a substantially rectangular structural member built up from, say, rolled steel channels with the rear wheel supporting portion of the lift being integral with the rear end of this frame and the front wheel supporting bar structure being movable along and between the longer parallel sides of this frame. In this second form of the invention the frame may be supported by a pair of hydraulic rams to provide maximum access clearance to the underside of the supported vehicle along its center line.

A further refinement and detail of the invention may include a spring means to assure the return of the front wheel supporting frame or structure to adjacent the rear wheel supporting structure as the vehicle leaves the lift and to maintain the front wheel supporting structure adjacent the rear wheel supporting structure when the lift is not used. Such a return mechanism assures that the lift will automatically function properly when used again.

The above menioned and other features and objects of this invention and the manner of attaining them will become more apparent and the invention itself will be best understood by reference to the following description of embodiments of the invention taken in conjunction with the accompanying drawings, wherein:

FIG. 5 is a top plan view of another embodiment of the lift of this invention including an open rectangular structural frame which may be supported upon one hydraulic lift column showing the front wheel supporting carriage in full lines in its retracted or "ready" position and in dashed lines in its forward and front wheel supporting position;

FIG. 6 is a side elevational view of the embodiment disclosed in FIG. 5 showing a vehicle frame and wheels in dashed lines supported on the forward position of the front wheel carriage;

FIG. 7 is a transverse sectional view of the lift frame as taken along line VII—VII of FIG. 5;

FIG. 8 is an enlarged fragmentary sectional view of the rear and front wheel supporting structures taken along line VIII—VIII of FIG. 5 showing the movable front wheel supporting carriage and the carriage return spring below the frame, and showing in dashed lines a vehicle wheel in various positions during the self-loading of the lift;

Figure 1:
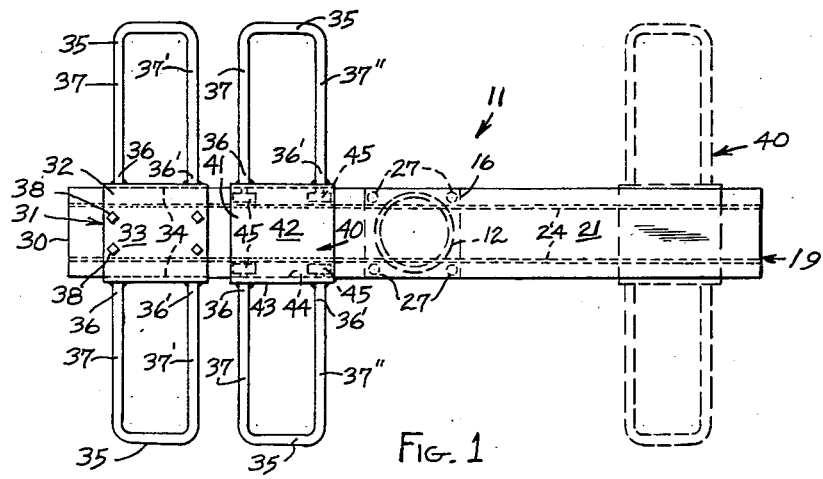
FIG. 1 is a top plan view of one embodiment of the vehicle lift of this invention showing the front wheel carriage in full lines in its retracted and "ready" position and in dashed lines in its forward and vehicle front wheel supporting position.
Figure 2:
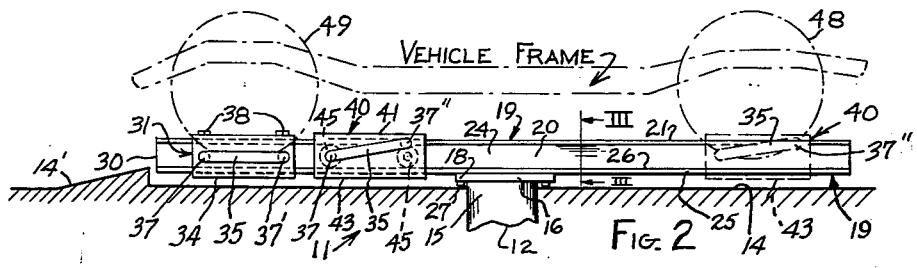
FIG. 2 is a side elevational view of the vehicle lift shown in FIG. 1 showing in its dashed line position a vehicle frame and wheels in dashed lines supported thereon.

FIG. 9 is a further enlarged fragmentary cross-sectional view of the forward bar and ramp of the rear wheel supporting structure and the rear bar of the front wheel supporting carriage taken along line IX—IX of FIG. 5, showing the wheel bridge ramp to prevent the front wheel supporting carriage from moving until the front wheels of the vehicle are seated therein; and FIG. 10 is a perspective view of another embodiment of the movable front wheel supporting carriage used in the lift according to FIG. 5 showing both supporting and guiding rollers mounted thereon, and inwardly bowed supporting bars.

(I) Single Central Beam Frame Lift

Referring to FIGS. 1 through 4, wherein there is disclosed a single-beam form of the vehicle lift of this invention, the lift 11 itself comprises a cylindrical lift column or ram 12 preferably operated hydraulically and reciprocable in a column bearing and casing sleeve 13 embedded in a concrete or other floor 14 of an automotive vehicle service area. The upper end 15 of the hydraulic ram 12 may carry a cap plate 16, preferably of square or rectangular form, projecting beyond the outer diameter of the column 12 and having bolting apertures 17 (not shown) in its overhanging edges or corners 18.

Figure 3:
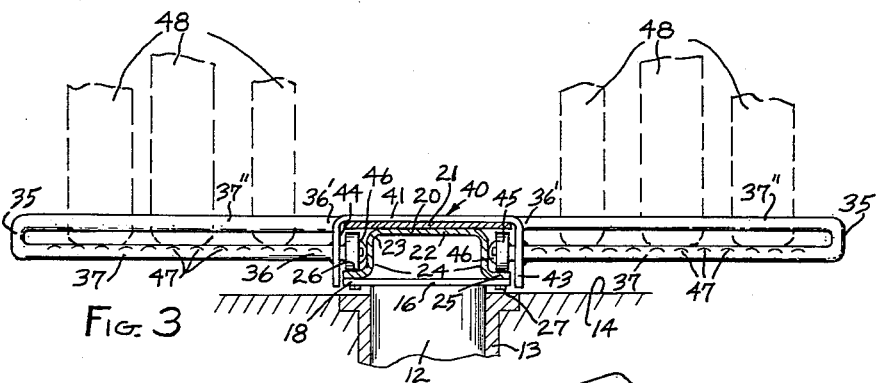
FIG. 3 is an enlarged cross-sectional view of the lift as taken along line III—III of FIG. 2 showing the movable front wheel supporting carriage or structure, and in dashed lines thereon various track width spaced wheels.

The longitudinally oriented frame 19 of the lift 11 is of strong structural properties and may be fabricated from two separate members; a lower member 20 and upper member 21. In transverse section, as shown in FIG. 3, the lower frame member 20 has a central horizontal flat section 22, having parallel longitudinal edges 23 aligned with the opposite sides of the column 12. At these edges of this flat central portion 22 there may depend leg sections 24 of equal length along said sides 23, each of which may terminate in an outwardly extending flange 25 having a horizontal upper surface 26. Welded to the lower surface of flanges 25 and corresponding with the apertures 17 in column cap plate 16 may be studs 27 for bolting the lift frame 19 to the column cap plate 16. Affixed such as by welding, riveting, bolting, or the like, to the central horizontal portion 22 of the lower member 20, is a frame cover plate or upper member 21 which extends outwardly from the parallel edges and depending legs 24, terminating above the extremities of flanges 25 to form channels or tracks of U-shaped cross-section for supporting and guiding the movable carriage 40 to be described later. Both the configured lower structural frame member 20 and the flat frame or upper member 21 should be at least approximately three feet longer than the wheelbase length of the longest vehicle which it is anticipated lift 11 will accommodate. The depth of the depending legs 24 and the width of each horizontal flange 25 of the lower structural frame member 20 are determined by strength considerations. Since the frame 19 is the main structural element of the lift 11, the section modulus of this combination, i.e., members 20 and 21, must be sufficient to render the frame 19 rigid within reasonable limits.

(I-A) Rear Wheel Fixed Support

Affixed to one end, the rear end 30, of the lift frame 19 is the rear wheel supporting structure 31 of the lift 11. This rear wheel supporting structure 31 is built-up mainly from a frame engaging base plate 32 of inverted U-shape configuration having a flat horizontal central portion 33 and oppositely disposed downwardly depending flanges or legs 34. The central frame straddling portion 33 should be as wide as the upper frame cover plate 21, and the downwardly depending legs or flanges 34 should preferably extend at least the depth of frame 19. Extending outwardly in opposite directions from each depending flange 34 may be horizontally aligned U-shaped wheel engaging bars or yoke elements 35 connected to the flange 34 at the ends 36 and 36' of the bar legs 37 and 37,' of of the U element 35, preferably by welding. The rear wheel structure base plate 32 then may be welded directly to the lift frame 19, or it may be adjustably or removably attached thereto by means of bolts 38 cooperating between the base plate 32 and a plurality of bolting holes (not shown) along the rear end 30 of the lift frame 19.

If desired, however, the ends 36 of the rear wheel yokes 35 may be welded directly to the depending legs 24 of the lower lift frame member 20, thus dispensing with the rear wheel structure base plate 31. Since the lift 11 is intended to be used for all sizes of cars, from "compacts" to the wide track vehicles first appearing in 1959, it is essential that the transverse width both of the frame 19 and the central portion 33 of the rear wheel engaging structure 31 be as narrow as possible. Thus the rear vehicle wheel supporting elements 35 are affixed to the frame 19 against relative movement therewith when a vehicle is driven or rolled over them in entry onto the lift 11.

(I-B) Front Wheel Movable Support

The relatively movable front wheel supporting carriage structure 40 of the lift 11 may be comprised of structure similar to the just described rear wheel supporting structure, having supporting plate 41 having a transverse central flat portion 42 as wide as the width of the frame cover plate 21 and a pair of oppositely disposed downwardly extending flanges or legs 43 straddling the cover plate 21. Again a pair of wheel engaging yokes 35, identical to those appearing as a part of the rear wheel structure 31, may be utilized which are connected to the depending legs 43 of the front wheel structure base 41. These elements or yokes 35 are coplanar, but preferably with their forward legs 37" lying in a horizontal plane above their rear legs 37. Mounted on the interior or frame side 44 of each of the depending legs 43 of the front wheel structure base 41 are a pair of rollers 45 (FIGS. 3 and 4) which cooperate on the upper surfaces 26 of the flanges 25 of the lower frame member 20, the rollers 45 being included between the frame flanges 25 and the frame cover plate 21 (see FIG. 3).

If desired, a pair of ball and socket bearing means 46 or another pair of rollers may be provided on the interior sides 44 of the depending flanges 43 or ends of stub shafts for the rollers 45 to work along the depending legs 24 of the lift frame 19 to provide guiding as well as bearing means for the front wheel supporting structure 40. Since it is crucial to the operation of this invention 11 that the front wheel supporting structure 40 be movable relative to the rear wheel supporting structure 31, previously described, it is necessary that the yokes 35 of the front wheel structure 40 not be fixed relative to the lift frame 19.

Figure 4:
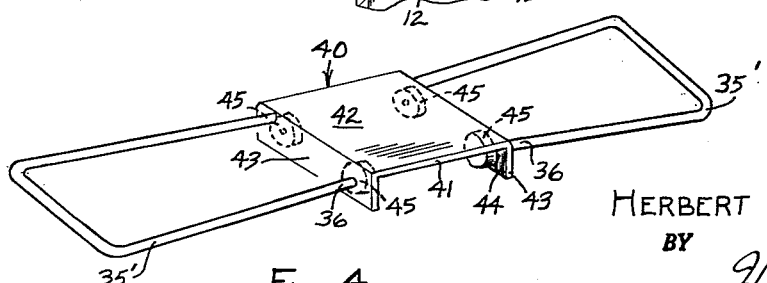
FIG. 4 is an enlarged perspective view of another embodiment of the front wheel carriage for the lift according to FIG. 1 showing the front wheel supporting bars in an outwardly diverging and modified form.

In FIG. 4 a modified form of the wheel supporting yokes 35' is shown wherein the front and/or rear legs 37 and/or 37" of the yoke 35' diverge from the carriage base 41 to accommodate the varying tire diameters which are usually encountered as the track width of the supported vehicle varies, in that narrower gauge vehicles usually have smaller diameter wheels. If desired, the modified yokes 35' may be used on the rear wheel support structure 31 as well as on the front wheel dolly 40.

(I-C) Operation of Lift

The operation of this lift 11 is essentially as follows:

The column 12 is retracted with the front wheel carriage 40 located against or adjacent the the rear wheel support structure 31, as illustrated by solid lines in FIG. 1; the vehicle is then aligned with the lift frame 19 and is driven on to the lift 11 so that the front wheels 48 pass over the rear wheel supporting structure 31 and into the front wheel carriage 40 to be supported between the opposing legs 37 and 37″ of the wheel supporting yokes 35 or 35′. At this point the front wheels 48 are free of the ground 14 and are supported entirely in the front wheel carriage 40. Then, as the vehicle continues to move relative to the frame 19, the front wheel dolly 40 moves along the frame 19 as the rollers 45 move on flanges 25. This action continues until the rear wheels 49 are engaged between the rear tire supporting yokes 35, at which time the vehicle is stopped as it is then properly positioned on the lift 11. The column 12 then may be raised. Thus an automobile of any wheelbase or track width may be conveniently accommodated on the lift 11 because of the narrow width of the frame 19, the nature of wheel support yokes 35, and the mobility of the front wheel carriage 40. Because of the rotational motion of the front vehicle wheels 48 relative to the rear legs 37 of the front wheel carriage yokes 35, the friction between the wheel 48 tires and these legs 37 prevents the front carriage 40 from moving out from under the front wheels 48 as they pass over front bar 37′ of the rear yoke 35, thus assuring proper operation of the lift 11 will occur at all times. In order to assure that this friction between the front tires 48 and the rear legs 37 of the front yoke 35 is sufficient to prevent the carriage from moving out from under the tires, the front bar 37″ may be raised relative to rear bar 37 and/or the upper surface of the rear bar or legs 37 of the front carriage 40 may be roughened, knurled, or provided with very small teeth 47 which hold the carriage 40 relative to the wheels 48 permitting the wheels 48 to seat properly on the front wheel carriage 40.

In FIG. 3, wherein various front wheels 48 of different vehicles are partially shown in dashed lines, it will be noted that the wheels 48 are supported by the yokes in such a manner that the wheels make no contact with the ground 14. If such were made, the combination of the friction between the tires of wheels 48 and the ground 14 between the bars 37, 37″ of the yokes 35 would prevent the front wheel carriage 40 from moving relative to the rear wheel 49 support 31 as the automobile is moved or driven onto the lift 11.

In using this lift 11 it is recommended that the ground or floor 14 of the building accommodating such lift 11 have small approach ramps 14′ (see FIG. 2) formed in the concrete of the floor 14 so that undue strain and shock is not imparted to the rear wheel engaging yokes 35 as the vehicle is driven onto the lift 11.

In generally describing this invention, it was mentioned that the lift 11 is for automobiles having at least one rear wheel and at least one front wheel. This is because there are at least two automobiles known to exist with either one front wheel and two rear wheels or one rear wheel and two front wheels. This lift 11 is capable of accommodating such vehicles in that the single wheel, as it is located on the center line of the car, may be supported on the frame 19 of the lift 11 itself. If the single wheel is at the front end of the vehicle, all that is required is that the car be backed onto the lift 11.

(II) Rectangular Frame Lift

In the second form of lift 60 of this invention, shown in FIGS. 5 through 10, the frame 61 assumes the form of a rectangular structure which may have transversely centrally thereof a supporting cross-member or bridge 62 comprised of structural members 63, such as channels or I beams, affixed to the cap plate 16 of the hydraulic lift column 12; or two hydraulic lift columns (not shown) may be used, one connected to each side 64 of the frame 61 between the rear 66 and front 66′ ends of the frame, in which case the bridge 62 may not be required. This latter arrangement provides for maximum accessibility to the under side of the vehicle supported upon the lift 60. The beam, or beams 63 of the central column bridge 62 may be straight between its ends, or it may have a downwardly offset central portion 65 (FIG. 7) which is supported by the cap plate 16 of the hydraulic column to provide additional center-line 71 clearance under the vehicle supported on the lift 60.

The frame 61 of the modified lift 60 has a pair of longitudinal side members 67 preferably formed from rolled structural channnels having upper 68 and lower 69 flanges opening inwardly on the webs 70 toward the center-line 71 of the lift 60 with the channel side stringers 67 being horizontally coplanar and parallel to one another.

(II–A) Rear Wheel Support

The vehicle rear wheel supporting structure 70 is preferably comprised of a pair of tube or bar members 72 and 73, parallel to one another, connected between the opposite rear ends 66 of the lift stringers 67. In this lift 60 of the invention, the rear wheel supporting bars 72 and 73 preferably are welded to the webs 70 of the channel stringer members 67 between the flanges 68 and 69 thereof; the rear wheel supporting bar member 72 having one or a pair of ramp plates 74 welded thereto to provide a means for the vehicle wheels 48 and 49 to ride over the rearmost fixed wheel supporting bar 72 as the lift 60 is loaded. The ramp plates 74 may be held in place by a bracket or gusset 75 (see FIG. 8) welded between the bar 72 and the ramp plate 74.

(II–B) Movable Front Wheel Support

In the lift 60 the front wheel supporting carriage 80 assumes a form identical in principle to that disclosed in the previously described lift 11, and also may be similar in structure to the rear wheel supporting means 72—75, in that the front wheel supporting carriage 80 is comprised of a pair of wheel supporting bars 81 and 82 parallel to one another at right angles to the frame stringers 67. The forward bar 82 also may be located above the horizontal plane of the rear bar 81 as described above. The adjacent ends 83 and 84 of bars 81 and 82, respectively, are mounted between bar support plates 85 on the opposite and outer sides of which rollers 86 are mounted for rolling engagement along the upper surfaces of the lower flanges 69 of the frame stringers or tracks 67. Each bar supporting plate 85 may also carry a second pair of vertical axis guide rollers 87 mounted perpendicularly to the flange 69 engaging and carriage supporting rollers 86. These rollers engage the vertical webs 70 of the frame 61 side stringers 67 to prevent binding or cocking of the front wheel carriage 80 as it moves longitudinally along the lift 60.

To provide for maximum rigidity of the bars 81 and 82 in the front wheel carriage 80, a longitudinal bracket 88 extending between the two bars 81 and 82 may be installed between the side supporting plates 85 (see FIG. 10).

The front ends 66′ of the stringers or tracks 67 may be joined by a structural member 89 to provide rigidity at the forward end 66′ of the frame 61.

A second or carriage 80 ramp plate 90 may be affixed to the forward edge of the forwardmost rear wheel supporting bar 73 to overlap the rear bar 81 of the front wheel carriage 80 (FIG. 9) and may be bracketed to the rear wheel structure 73 by a structural member 91. The carriage ramp plate 90 must clear the top of the adjacent bar 81 of the front wheel supporting carriage 80 when it is in its retracted position. This ramp 90 allows the front wheels 48 of the vehicle to engage the front wheel carriage 80 in the proper manner so that the carriage 80 is not forced out from under the the front wheels 48 as the vehicle is positioned on the lift 60. While the possibility of such an incident occurring is decidedly negligible, the front wheel carriage ramp 90 is a safety means assuring that such will never occur; otherwise the vehicle could be severely damaged if the wheels 48 were not supported properly and the lift 60 were activated.

By the simple normal operation of this lift 60 the front wheel carriage 80 should always be in position adjacent the forward rear wheel supporting bar 73 with the rear carriage bar 81 under the end of the ramp 90 ready to receive the front wheels 48 of a vehicle. However, in some instances the front wheel carriage 80 may not always be where it should be, as through inadvertent manual movement, requiring that it be manually returned to its normal position. To obviate this manual positioning of the front wheel carriage 80, an automatic return mechanism may be provided, which may comprise a low tension coil spring 94 connected between a bracket 95 on the lift frame 61 and a bracket 96 on the front wheel carriage 80, as shown in FIG. 8, which spring 94 is extended when the vehicle is on the lift as shown in FIG. 6.

Since the vehicles which have the narrowest track width usually have the smallest diameter tires, if it is desired to support all vehicle wheels at essentially the same geometrically oriented points on the wheels, the fixed wheel supporting bars 72 and 73 and the bars 81 and 82 on the front wheel carriage 80 may be bowed inwardly toward each other between their ends (see bars 98 in FIG. 10) so that along the longitudinal center-line 71 of the lift 60 the distance between the supporting bars 72 and 73, and between bars 81 and 82 is less than this distance adjacent the frame side stringers or tracks 67. Such bowing of the supporting bars 72, 73, 81 and 82 assures that the wheels 48 and 49 supported will not fall too deeply between the supporting bars 98. This feature prolongs the life of the tire since the support force is substantially vertical and normal to the tire, and this feature also makes it easier to drive the vehicle onto and off of the lift 60.

*(II-C) Operation*

Normally, when the lift 60 is in operation, the vehicle to be supported is driven onto the lift 60 over the rear ramps 74 with the front wheels 48 passing over the rear wheel supporting bars 72 and 73 and ramp 90 to engage the front wheel supporting carriage 80. As soon as the carriage 80 is engaged, the front wheel carriage 80 begins to move forward relative to the rear supporting bars 72 and 73, rolling on its rollers 86 along track 67 as the vehicle continues to move forward relative to the lift 60 itself, the process continuing until the rear wheels 49 of the vehicle are supported between the fixed rear wheel supporting bars 72 and 73. The column 12 or columns 12' may then be activated to raise the lift 60. When the servicing operation on the vehicle is completed, the lift 60 is lowered and the vehicle is driven off of the lift by reversing the procedure; the front wheels 48 of the vehicle returning the front wheel carriage 80 to its original position adjacent the rear wheel supporting structure 72—75 aided by the springs 94 (see FIGS. 5 and 8).

Due to the simple structure of this lift 60, any automobile with a given common track width may be accommodated merely by assuring that the spacing between the side stringers 67 of the lift 60 is sufficient to accommodate any known make of automobile, the wheelbase length variable being automatically accommodated through the use of the movable front wheel supporting carriage 80.

In both forms 11 and 60 of this invention, the lift itself is readily adaptable to existing hydraulic lifts since the columns 12 of these lifts generally all have a cap plate 16 of the character described herein mounted thereon. Any cap plate 16 modifications required to mount the lift 11 or 60 of this invention to such hydraulic lift columns 12 would probably be limited to the drilling of the proper holes for attaching the lift frame 19 or 61.

The outstanding feature of this invention is that any vehicle of known or anticipated track width and wheelbase length may be supported conveniently and efficiently upon the lift 11 or 60 by supporting the wheels themselves, negating the use of manually adjustable frame engaging attachments for the lift. Since, from year to year, the frame design of most automobiles is changed, frame lifts require the service station operator to maintain a supply of expensive special attachments in order that such frame lifts not become obsolete. Also, a pair of the lifts 11 or 60 of this invention may be installed in a service station to accommodate two "compact" cars, or two standard size cars, or one of each simultaneously rather than have two different size old-style frame or wheel lifts in the garage, one of which may be idle the predominant portion of the time.

While there is described above the principles of this invention in connection with specific apparatus, it is to be clearly understood that this description is made only by way of example and not as a limitation to the scope of this invention.

What is claimed is:
1. A universal lift for automotive vehicles having at least one rear wheel and at least one front wheel, comprising:
   (A) a reciprocal lift column
   (B) a frame having beam means mounted rigidly to said column, said beam means having
       (1) a pair of spaced lower horizontal parallel surface portions, and
       (2) an upper surface portion having an upper edge spaced above said lower surface portions,
   (C) a vehicle rear wheel supported and locating structure fixed relative to said frame and having
       (1) a rigid forward edge, and
       (2) an upper surface spaced above said lower surface portions of said frame and below said upper surface portion of said frame, and
   (D) a vehicle front wheel supporting means movable by said front wheel as said vehicle moves onto said lift, said front wheel supporting means comprising:
       (1) first and second spaced wheel engaging rigid horizontal bars having upper surfaces spaced above said lower surface portions of said frame and below said upper surface portion of said frame,
       (2) a pair of spaced plate means bridging the space between adjacent ends of said bars, said adjacent ends of said bars being rigidly and directly connected to one and the same side of its corresponding said plate means, and
       (3) roller means attached to the opposite side of each said plate means for completely supporting said front wheel supporting means and the front end of said vehicle on and above said lower horizontal surface portions of said beam means for free movement along said parallel horizontal surface portions,
whereby said lift automatically adjusts to engage the wheels of automotive vehicles of various wheelbases and tracks with said rigid forward edge of said rear wheel supporting structure being located relative to said first rigid bar of said front wheel supporting means to permit the front wheel of the vehicle to ride over said first rigid bar onto said front wheel supporting means before engaging said second rigid bar, when said first rigid bar of said front wheel supporting means is adjacent said rigid forward edge of said rear wheel supporting structure.

2. A vehicle lift according to claim 1 wherein said frame comprises a single structural member affixed to said column and extending the length of said lift.

3. A vehicle lift according to claim 2 wherein said front wheel supporting means is a rollered carriage, said plate means straddles said structural member, and said spaced bars comprise vehicle wheel engaging yokes extending outwardly from opposite sides of said plate means.

4. A vehicle lift according to claim 3 wherein said yokes comprise U-shaped bar members having the open ends of said U connected to said frame straddling plate means.

5. A vehicle lift according to claim 3 wherein said frame straddling plate means has downwardly depending flanges disposed on opposite sides of said structural member of said frame, and said rollers are mounted on ends of said yokes attached to said flanges.

6. A vehicle lift according to claim 2 wherein said rear wheel supporting and locating structure comprises a pair of U-shaped wheel engaging yokes extending horizontally outwardly from opposite sides of said structural member of said frame.

7. A vehicle lift according to claim 1 wherein said frame comprises a pair of spaced apart parallel longitudinally oriented structural side stringers, each said stringer having one of said horizontal parallel surfaces along at least part of its length, and a structural bridge extending between said stringers connecting said frame to said column.

8. A vehicle lift according to claim 7 wherein said rear wheel supporting and locating structure comprises a pair of spaced apart bars extending transversely of said frame between said stringers and rigidly connected to said stringers.

9. A vehicle lift according to claim 8 including a vehicle wheel ramp affixed to the rearmost bar of said pair of rear wheel supporting bars.

10. A vehicle lift according to claim 8 wherein said pair of spaced bars are bowed toward each other in a horizontal plane between their ends.

11. A vehicle lift according to claim 7 wherein said front wheel supporting means comprises a pair of spaced apart bars extending transversely of said frame, said plate means comprises a pair of bar supporting plates connecting the opposite adjacent ends of said bars, and said rollers are mounted on each said plate for engagement with said horizontal surface of each said stringer for rolling support of said front wheel supporting means.

12. A vehicle lift according to claim 1 including resilient positioning means for said front wheel support means connected between said frame and said front wheel support means.

13. A vehicle lift according to claim 1 wherein said rear wheel supporting and locating structure comprises a pair of U-shaped wheel engaging yokes extending horizontally outwardly from opposite sides of said structure member of said frame, and said spaced bar means of said front wheel supporting means also comprises a pair of U-shaped wheel engaging yokes extending horizontally outward from opposite sides of said pair of plate means.

14. A vehicle lift according to claim 13 wherein said wheel engaging yoke means comprise parallel bars.

15. A vehicle lift according to claim 13 wherein the bars comprising the sides of said yoke means are spaced more from each other at their outer ends than near the center of said frame.

References Cited in the file of this patent

UNITED STATES PATENTS

| | | |
|---|---|---|
| 1,594,840 | Keyworth | Aug. 3, 1926 |
| 2,099,274 | Myers | Nov. 16, 1937 |
| 2,199,524 | Kroll | May 7, 1940 |
| 2,285,989 | Kroll | June 9, 1942 |
| 2,624,546 | Haumerson | Jan. 6, 1953 |

FOREIGN PATENTS

| | | |
|---|---|---|
| 165,990 | Australia | Nov. 14, 1955 |
| 730,971 | Great Britain | June 1, 1955 |